J. H. BLESSING.

CHECK VALVE.

No. 10,487. Reissued June 10, 1884.

Witnesses:
Wm. A. Pollock
Geo. H. Evans.

Inventor:
James H. Blessing,
By his attorney
E. N. Dickerson Jr.

N. PETERS, Photo-Lithographer, Washington, D. C.

UNITED STATES PATENT OFFICE.

JAMES H. BLESSING, OF ALBANY, NEW YORK.

CHECK-VALVE.

SPECIFICATION forming part of Reissued Letters Patent No. 10,487, dated June 10, 1884.

Original No. 281,439, dated July 17, 1883. Application for reissue filed October 9, 1883.

*To all whom it may concern:*

Be it known that I, JAMES H. BLESSING, of the city and county of Albany, in the State of New York, have invented certain new and useful Improvements in Check-Valves, of which the following is a specification.

My invention relates to improvements in the construction of straight-way check-valves; and the objects of my improvements are to simplify the construction of such valves and to render the internal parts removable, so that those parts may be readily renewed and repaired without displacing the valve-casing from its position in any pipes wherein the device is fixed. I attain these objects by means of the construction illustrated in the accompanying drawings, which form part of this specification, and in which—

Figure 1:
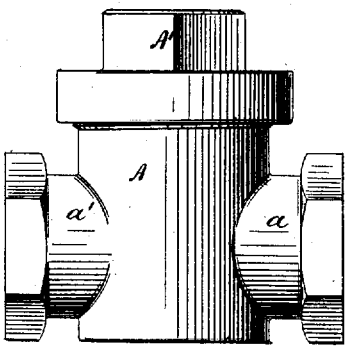
Figure 2:
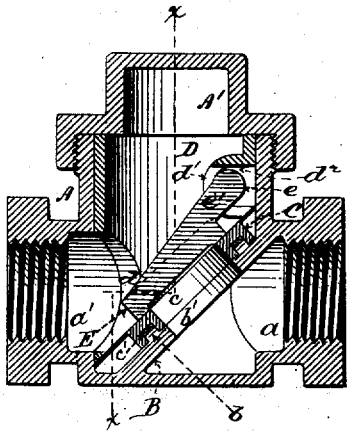
Figure 4:
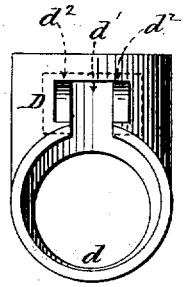
Figure 3:
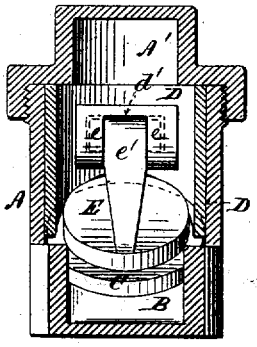
Figure 5:
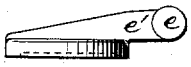

Figure 1 is a side elevation of my valve; Fig. 2, a longitudinal section of the same; Fig. 3, a transverse section at the line *x x* of Fig. 2; Fig. 4, a rear elevation of the removable sleeve, and Fig. 5 a detached side elevation of the clack-valve.

As illustrated in the drawings, A is the valve-casing, provided with the branches *a* and *a'*, for receiving, respectively, the usual induction and eduction pipes. The body of said casing is divided by a transverse partition or diaphragm, B, arranged, as shown in Fig. 2, in an inclined position between the induction and eduction openings. The said partition is provided with an annular tongue, *b*, which is made concentric to the passage *b'* through said partition.

C is a removable valve-seat, provided with an opening, *c*, which corresponds to the passage *b'* through the partition of the valve-casing, and with an annular groove, that is adapted to fit upon the annular tongue *b*, and which contains an elastic packing, *c'*. The said removable seat and the mode of making a tight joint between it and the partition B will be found fully set forth and described in Letters Patent No. 272,634 of the United States, granted to me on the 20th day of February, 1883.

D is a removable sleeve, that is fitted into the body of the casing A, and has its lower end cut to conform to the angle of the partition B of said casing, so that it will rest upon and bear against the upper face of the valve-seat C at the opposite sides of said seat, as shown in Fig. 3. The upper end of the sleeve conforms to the upper edge of the body of the casing A, so that when the bonnet A' of said casing is screwed down to its place it (the bonnet A') will press against the upper end of the sleeve D and hold the seat C securely in position. The sleeve D is provided with an opening, *d*, which corresponds to the eduction-opening *a'* of the valve-casing, and it also has an opening, *d'*, through which the arm of the clack-valve passes. On the outer side of said sleeve, at each side of the opening *d'*, the concave recesses $d^2$ are formed, to receive the trunnions of the clack-valve, which recesses coact with said trunnions to form the hinge-joint required for such valves.

E is the clack-valve, provided with trunnions *e*, which project from the opposite edges of the arm *e'* in such manner that they will engage in the recesses $d^2$, and serve as pivotal centers on which said valve will swing.

The several parts constructed in the manner herein shown and described, and as I preferably make them so that all the parts for the same sizes of valves will be interchangeable, the mode of assembling the said parts to complete the operative device is as follows: The valve-seat C, containing the elastic packing *c'*, is first fixed in place on the annular tongue *b* of the partition B in the valve-casing A. The clack-valve E is inserted into the sleeve D, so that the trunnions *e* of said valve will engage in the recesses $d^2$ in said sleeve. The sleeve D and valve E are together inserted into the cylindrical body of the valve-casing in such manner that the beveled end of said sleeve will bear fairly upon opposite sides of the upper face of the seat C. When this is accomplished, the trunnions *e* of the valve will be locked in position between the concave faces of the recesses $d^2$ and the cylindrical body of the casing A in such manner that the valve E can vibrate with perfect freedom; but it cannot be displaced from its true position. The bonnet A' is then screwed down on the upper end of the cylindrical body of the valve-casing A, and thereby the confinement of all the inner parts of the device securely in their respective places is effected.

It will be readily seen that all the inner parts of my device are so perfectly accessible that any renewment of or repairs to them may be effected without removing the casing A from its place in a line of pipe, and for that reason it possesses a manifest advantage over the ordinary form of valves, whose seats are an integral part of the casing, so that when the seats become cut or worn by use the casings are rendered useless and must be discarded.

I claim as my invention—

1. In a straight-way valve, the combination, with a valve-casing, A, having a transverse partition or diaphragm, B, arranged in an inclined position, as herein shown and described, and removable seat C, fixed on said partition, of the removable sleeve D, having its lower end made to conform to the angle of the partition B, the said sleeve being adapted to secure the seat C in its place, as herein specified.

2. In a straight-way valve, the combination, with a valve-casing, A, provided with a transverse partition or diaphragm, B, fixed in an angular position therein, as herein described, of the removable sleeve D, provided with recesses $d^2$, and the clack-valve E, provided with trunnions $e$, adapted to engage in the recesses $d^2$, as and for the purpose herein specified.

3. In a straight-way valve, the combination, with a removable sleeve provided with recesses or pockets, which are adapted to form one part of the hinge-joint on which the valve vibrates, of a clack-valve provided with trunnions adapted to engage in the recesses or pockets in the removable sleeve, in the manner and for the purpose herein specified.

4. The combination, in a straight-way valve, of a valve-casing, an inclined removable valve-seat, an inclined valve, and a removable sleeve, the valve being pivoted in the sleeve, substantially as described.

5. In a straight-way valve having an inclined partition provided with an annular tongue or extension, combined with a valve-seat provided with an annular cavity, and adapted to inclose said extension, a packing between said valve-seat and partition, and a valve closing against the valve-seat, substantially as described.

6. The combination, in a straight-way valve, of a valve-casing, an inclined valve-seat, and a valve pivoted in a sleeve within the casing independent of the valve-casing itself, substantially as described.

7. The combination of the valve-casing A, the valve E, the detachable valve-seat C, and the bonnet A′, the opening in the valve-casing closed by the bonnet being greater in diameter than the valve-seat C, or the valve E, thereby allowing of the removal of the valve and valve-seat through the opening closed by the bonnet, substantially as described.

JAMES H. BLESSING.

Witnesses:
GEO. H. EVANS,
WM. A. POLLOCK.